(12) United States Patent
Park (10) Patent No.: US 10,694,893 B2
(45) Date of Patent: Jun. 30, 2020

(54) REAL-TIME FRYING OIL ACID VALUE MEASURING AND FRYING OIL ACID VALUE INFORMATION PROVIDING SYSTEM AND METHOD

(71) Applicant: Jung Geun Park, Gyeonggi-do (KR)

(72) Inventor: Jung Geun Park, Gyeonggi-do (KR)

( * ) Notice: Subject to any disclaimer, the term of this patent is extended or adjusted under 35 U.S.C. 154(b) by 24 days.

(21) Appl. No.: 14/901,719

(22) PCT Filed: Dec. 3, 2014

(86) PCT No.: PCT/KR2014/011750
§ 371 (c)(1),
(2) Date: Dec. 28, 2015

(87) PCT Pub. No.: WO2015/084044
PCT Pub. Date: Jun. 11, 2015

(65) Prior Publication Data
US 2016/0338540 A1    Nov. 24, 2016

(30) Foreign Application Priority Data

Dec. 4, 2013    (KR) .......................... 10-2013-0150008

(51) Int. Cl.
*A47J 37/12*    (2006.01)
*G06Q 50/12*    (2012.01)
(Continued)

(52) U.S. Cl.
CPC ............ *A47J 37/1266* (2013.01); *A23D 9/00* (2013.01); *G06Q 20/202* (2013.01); *G06Q 50/12* (2013.01); *G07F 17/0085* (2013.01)

(58) Field of Classification Search
CPC ... A47J 37/1266; G06Q 50/12; G06Q 20/202; G07F 17/0085
(Continued)

(56) References Cited

U.S. PATENT DOCUMENTS 3,852,997 A * 12/1974 Horvath ................. G01N 25/64
73/61.46
4,951,558 A *  8/1990 Figliuzzi ............... A47J 36/165
99/336
(Continued)

FOREIGN PATENT DOCUMENTS

KR    10-1998-0028104 A  *  7/1998
KR    10-2010-0115628 A  * 10/2010
KR    10-2010-0128808 A  * 12/2010

OTHER PUBLICATIONS

WIPO, Korea International Search Authority, International Search Report dated Mar. 23, 2015 in International Patent Application No. PCT/KR2014/011750, 2 pages.
(Continued)

*Primary Examiner* — Ibrahime A Abraham
*Assistant Examiner* — John J Norton
(74) *Attorney, Agent, or Firm* — Cantor Colburn LLP (57) ABSTRACT

A system for measuring frying oil acid value and providing frying oil acid value information in real time according to the present invention includes a fryer provided in a branch shop, configured to cook fried food, and having a function of measuring TPM value of frying oil, a POS terminal configured to manage frying oil information and customer information including phone numbers of customers of the branch shop, an integration server configured to collect and analyze the frying oil information and the customer information, and a customer terminal configured to make an order of the fried food via a communication with the POS terminal or the integration server. According to the present invention, a sanitary dining environment can be provided since shops cannot arbitrarily reuse frying oil, and a brand image can be improved by providing a real-time information service to customers.

6 Claims, 5 Drawing Sheets

(51) Int. Cl.
*G07F 17/00* (2006.01)
*G06Q 20/20* (2012.01)
*A23D 9/00* (2006.01)

(58) Field of Classification Search
USPC .................................................. 99/330, 403
See application file for complete search history.

(56) References Cited

U.S. PATENT DOCUMENTS

| | | | | |
|---|---|---|---|---|
| 5,818,731 | A * | 10/1998 | Mittal | A47J 37/1266 |
| | | | | 702/22 |
| 6,600,306 | B1 * | 7/2003 | Pernot | A47J 37/1266 |
| | | | | 324/423 |
| 2001/0054357 | A1 * | 12/2001 | Tateyama | A47J 37/1266 |
| | | | | 99/330 |
| 2008/0222004 | A1 * | 9/2008 | Pollock | G06Q 30/0603 |
| | | | | 705/15 |
| 2010/0064901 | A1 * | 3/2010 | Clothier | A47J 36/02 |
| | | | | 99/331 |
| 2010/0201528 | A1 * | 8/2010 | Bruinsma | A47J 37/1266 |
| | | | | 340/584 |
| 2010/0282088 | A1 * | 11/2010 | Deuber | A47J 31/52 |
| | | | | 99/281 |
| 2011/0238310 | A1 * | 9/2011 | Estrellado | A47J 36/321 |
| | | | | 702/1 |
| 2016/0033463 | A1 * | 2/2016 | Robertson | A47J 37/1223 |
| | | | | 426/231 |

OTHER PUBLICATIONS

Kyochon F/B, *Transmittance test for management regulations relating to frying oil and sanitation of franchisees*, http://blog.naver.com/ljc0726/130042113615, Feb. 6, 2009, AV Check Co., Ltd., 9 pages.

* cited by examiner

REAL-TIME FRYING OIL ACID VALUE MEASURING AND FRYING OIL ACID VALUE INFORMATION PROVIDING SYSTEM AND METHOD

RELATED APPLICATIONS

This application is the U.S. National Phase of and claims priority to International Patent Application No. PCT/KR2014/011750, International Filing Date Dec. 3, 2014, entitled Real-Time Frying Oil Acid Value Measuring And Frying Oil Acid Value Information Providing System And Method, which claims benefit of Korean Patent Application Serial No. 10-2013-0150008 filed Dec. 4, 2013 entitled System And Method Of Real-Time Measuring Acid Value Of Frying Oil And Providing Measurement Information Thereof both of which are incorporated herein by reference in their entireties.

TECHNICAL FIELD

The present invention relates to a method and a system for measuring frying oil acid value and providing acid value information in real time, and more particularly, to a method and a system for measuring frying oil acid value and providing acid value information in real time, providing a real-time frying oil acid value measuring device, basically blocking the use of rancid frying oil by automatically cutting off the power supply when the frying oil acid value exceeds a reference value, blocking the psychological attributes of a shop clerk to use longer the frying oil by causing the acid value information of each branch shop to be transmitted to headquarters integration server in conjunction with a POS terminal, and dispelling the insecurity of customers that the frying oil would be excessively reused in order to reduce costs by providing the acid value information to customers ordering at shop in the form of an LED electronic display and providing the acid value information to customers ordering by phone in the form of a text message, thereby enhancing the brand's public image and increasing sales, which can eventually contribute to public health promotion.

BACKGROUND

Generally, when a customer selects fried chicken at a fried chicken shop, important factors considered by customers would be quality of chicken meat, taste and flavor of source, and costs, etc., in order. In particular, though there may be slightly different depending on regions, customers generally tent to prefer a particular brand. One of the reasons why the customers prefer a certain brand is a proper use of frying oil. For example, a particular brand can give to the customers a belief that the brand will use good frying oil of condition.

Meanwhile, though the quality of chicken meat and the source are used to advertise brand, they have been overused and wouldn't be of help to advertisement of brand. However, if the condition of frying oil used in each branch shop is notified to customers, the customers who want to have fresh food appreciate the brand of the branch shops.

Frying oil is generally oxidized and altered when a certain period of time is elapsed. For example, frying oil is rancid by heating, contact with air, light, or moisture. Once frying oil is rancid, burnt smell and smoke come out of the frying oil, bubbles occur when cooking food, and it becomes sticky and dark color.

As frying oil is used, heating temperature is high, and viscosity increases, smoke point is lowered. Smoke point is a temperature at which oil is burnt. If smoke point is lower, food is easy to burn, thereby downgrading the quality of fried food as well as becoming a cause of cancer in severe case.

DISCLOSURE

Technical Problem

Therefore, a user must replace rancid frying oil with fresh frying oil at a proper time. However, in general, since there is no notification means for accurately notifying the replacement time of frying oil in fryer to the user, the user could not help replacing the frying oil by directly checking the rancid state of frying oil with his eye. Therefore, excessively rancid frying oil may be still used because the rancid state of frying oil is not accurately checked with naked eye; otherwise the user mistakes the good frying oil as rancid one and replaces it for new frying oil, resulting in excessive use of frying oil.

To resolve above the problems, conventional approaches generally consider 'first-used-date', 'the number of uses', 'total-used-time', etc. of frying oil, or measure acid value by using a litmus paper in order to replace rancid frying oil with new frying oil at a proper time. However, the conventional approaches cause other problems in that since most of the frying oil information is managed depending on user's subjectivity, objective and continuous management is practically impossible, and that in case of using a litmus paper, it is also impossible to continue due to busy cooking environment.

SUMMARY

The present invention is proposed to resolve the problems of the prior art described above. An object of the present invention is to provide a method and a system for measuring frying oil acid value and providing acid value information in real time, for automatically measuring frying oil acid value by programmed measurement cycle in the form of manual to allow an optimal replacement time of frying oil to be determined, an acid value measuring device to be selectively dipped into the frying oil of high temperature according to the programmed manual.

It is another object of the present invention is to provide a method and a system for measuring frying oil acid value and providing acid value information in real time, for measuring frying oil information in real time and providing the acid value information to customers ordering at shop in the form of electronic display or providing the acid value information to customers ordering by phone in the form of a text message.

It is still another object of the present invention is to provide a method and a system for measuring frying oil acid value and providing acid value information in real time, for grading acid value of frying oil and providing the grade index in color form for customers to be easily recognized.

It is still another object of the present invention is to provide a method and a system for measuring frying oil acid value and providing acid value information in real time, for allowing headquarters to manage frying oil of each branch shop in order to satisfy the expectations psychology of customers that better quality of frying oil would be provided via headquarters management.

It is still another object of the present invention is to provide a method and a system for measuring frying oil acid value and providing acid value information in real time, for allowing a frying oil acid value measuring device to automatically cut off the power supply when the frying oil acid value exceeds a reference value and a shop clerk to be free from deciding displacement of the frying oil depending on his or her subjectivity.

A system for measuring acid value of frying oil and providing acid value information of the frying oil in real time, according to some embodiments of the present invention, includes a fryer configured to cook fried food, installed in a branch shop, and having a function of measuring TPM value of frying oil, a POS terminal configured to manage frying oil information and customer information including phone numbers of customers of the branch shop, an integration server configured to collect and analyze the frying oil information and the customer information, and a customer terminal configured to make an order of the fried food via a communication with the POS terminal or the integration server.

A method of measuring acid value of frying oil and providing acid value information of the frying oil in real time, according to some embodiments of the present invention, includes setting a real-time TPM measurement cycle form measuring a TPM value of the frying oil by a timer, measuring and updating the TPM value in real time based on the TPM measurement cycle by a controller, determining a replacement time of the frying oil based on a result of comparison between the TPM value and a reference value stored in a memory, grading, when the TPM value is below the reference value, the TPM value based on a level of quality of the frying oil and determining a grade index for a grade of the TPM value, transmitting the TPM value and the grade index to a shop monitor to display the TPM value and the grade index on the shop monitor for a purchase by order at shop, and transmitting the TPM value and the grade index to a POS terminal and to display the TPM value and grade index on a customer terminal for a purchase by order by phone.

Advantageous Effects

As described above, according to the configuration of the present invention, it is possible to expect the following effects.

First, it is possible to contribute to formation of safe food culture and promotion of public health by dispelling the insecurity of customers that the frying oil used by shop is unhealthy by not being capable of directly verifying the condition of the frying oil and the doubt of customers that the frying oil is excessively reused, and providing confidence that the frying oil is frequently replaced via frying oil acid value information service.

Second, it is possible to block in advance the urge that a shop clerk uses longer frying oil away from the eyes of customers by managing the frying oil acid value information of each branch shop, which is transmitted to headquarters integration server from POS terminal.

Third, it is possible to contribute to boost sales by raising brand's public image via the frying oil acid value information service and utilizing the service in brand marketing.

DETAILED DESCRIPTION

The above and other objects, features, advantages and technical and industrial significance of this invention will be better understood by reading the following detailed description of exemplary embodiments of the present invention. In figures, size or relative sizes of layers or areas may be exaggerated for clarity. The same references will be used throughout the specification to refer to same or like components. Specific terms used in this disclosure and drawings are used for illustrative purposes and not to be considered as limitations of the present disclosure. Exemplary embodiments of the present disclosure have been described for the sake of brevity and clarity. Accordingly, one of ordinary skill would understand the scope of the claimed invention is not to be limited by the explicitly described above embodiments but by the claims and equivalents thereof.

Exemplary embodiments of a system for measuring frying oil acid value and providing acid value information in real time according to the present invention are described in detail below with reference to the accompanying drawings.

As society has advanced, awareness of customers for food safety is also increased, and thus the high-end recognition for food safety has appeared in a fried food industry as a new requirement. In particular, in case of fried food of a famous brand which many customers are looking for, it is a key to ensure the safety of frying oil F.

For fried chicken and other fried food to have flavor, texture of food, appearance, or nutritional value matters, but fried chicken and other fried food fried by rancid frying oil F may harm customers' health. While properties required to cook the fried food are stability of heating, stability of preservation against natural oxidation, color, flavor, etc., the present invention will be primarily described with respect to rancidity management indicating the extent to which organic matter generates a fatty acid by oxidation.

Figure 1:
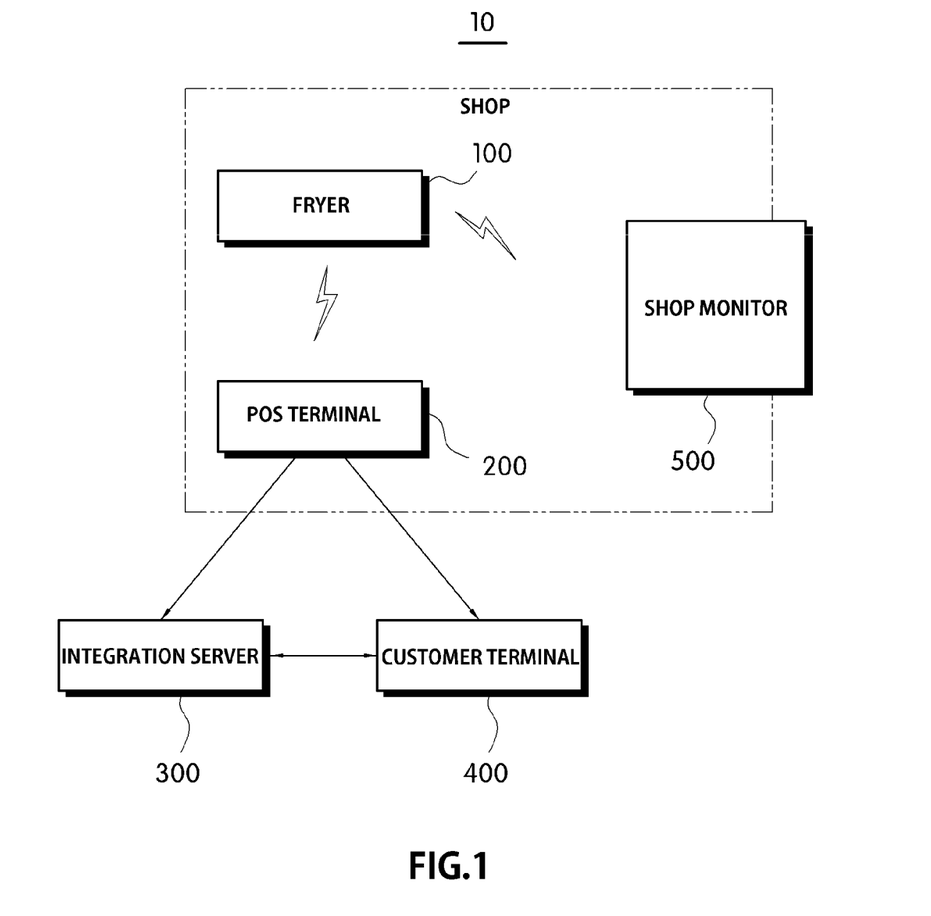
FIG. 1 is a block diagram of a system for measuring frying oil acid value and providing acid value information in real time according to the present invention.

Referring to FIG. 1, a system 10 for measuring frying oil acid value and providing acid value information in real time may comprise a fryer 100 that is installed in branch shop and has TPM sensor function of frying oil, a POS terminal 200 that manages frying oil information and other information of the branch shop and customer information including phone numbers of customers, an integration server 300 that collects and analyzes the frying oil information and the customer information, and a customer terminal 400 that is capable of communicating with the POS terminal 200 and/or the integration server 300 and ordering the fried food via the communication.

The POS terminal 200 may directly transmit TPM value of frying oil to the customer terminal 400, or transmit the frying oil acid value information to the integration server 300 via communication network. For example, The POS terminal 200 may directly provide the frying oil acid value information to a customer by transmitting the frying oil TPM value together with delivery information to the customer terminal 400 in the form of a text message in conjunction with order of customer. The POS terminal 200, for example, may transmit to the customer terminal 400 a text message on which fried food ordered by customer is being cooked in condition of frying oil % TPM 1.5 and it will be delivered within 10 minutes carefully.

The integration server 300 can collectively manage the frying oil acid value information of each branch shop, generate an event, and provide it to the customer terminal 400 in conjunction with order of customer. The integration server 300 can receive the payment information generated by the order of customer from the POS terminal 200, and proceed with the payment process in conjunction with a financial server such as credit card companies and banks. The integration server 300 may includes a separated management server for frying oil rancidity.

As such, the integration server 300 can manage such that frying oil information based on the situation of each branch shop is transmitted to the integration server 300 from the POS terminal 200 in real time and the real time information is transmitted to the customer terminal 400. Thus, customer confidence will be higher than that of direct management of each branch shop, and quality of frying oil used in each branch shop can be more improved.

The customer terminal 400 may be a mobile terminal such as smart phone, cellular phone, notebook computer, etc., or may be any device including communication function such as wireless communication via mobile communication network, local area network, etc. Further, the customer terminal 400 may be a wired terminal capable of receiving text messages. That is, there is no particular restriction for the customer terminal.

For order by phone as well as order at shop, the system 10 for measuring frying oil acid value and providing acid value information in real time may further comprise a shop monitor 500 installed in each branch shop, which is capable of directly displaying frying oil TPM value from the fryer 100 or communicating with the POS terminal 200 or the integration server 300. The shop monitor 500 may be installed outside of the shop in order for passers-by to see the measurement value, as well as installed inside of the shop.

Meanwhile, unsaturated fatty acid and trans fatty acid in frying oil have been pointed out as a cause of cardiovascular disease. TPM is proposed as one of guidelines for unsaturated fatty acid and trans fatty acid. TPM (Total Polar Material) uses units of % TPM, and commonly refers to a number of fatty acids such as monoglycerides, diglycerides, aldehyde, ketone, etc. TPM is also used as a metric for lipolysis rate and used as an indicator for measuring the optimal state of the frying oil, accordingly.

Since the frying oil F contains unsaturated fatty acid, etc., the unsaturated fatty acid in frying oil F used for fried food reacts chemically with heat, sunlight, or oxygen or moisture in the air to alter and acidify the frying oil. Reference values that relate to the extent to which the frying oil is rancid, are defined by TPM in Table 1.

TABLE 1

| Frying oil Grade | Quality of Frying oil | Condition for replacement | Grade Index |
|---|---|---|---|
| 1~14% TPM | Fresh | Good | Green |
| 14~18% TPM | Little used | | |
| 18~22% TPM | Available | | |
| 21~24% TPM | Replacement is needed | Needed | Yellow |
| More than 24% TPM | Rancid | Poor | Red |

According to the present invention, the fryer 100 may comprise a built-in or detachable external frying oil TPM sensor unit 140 capable of generating TPM value of frying oil F. First, a built-in frying oil TPM sensor is described.

Figure 2:
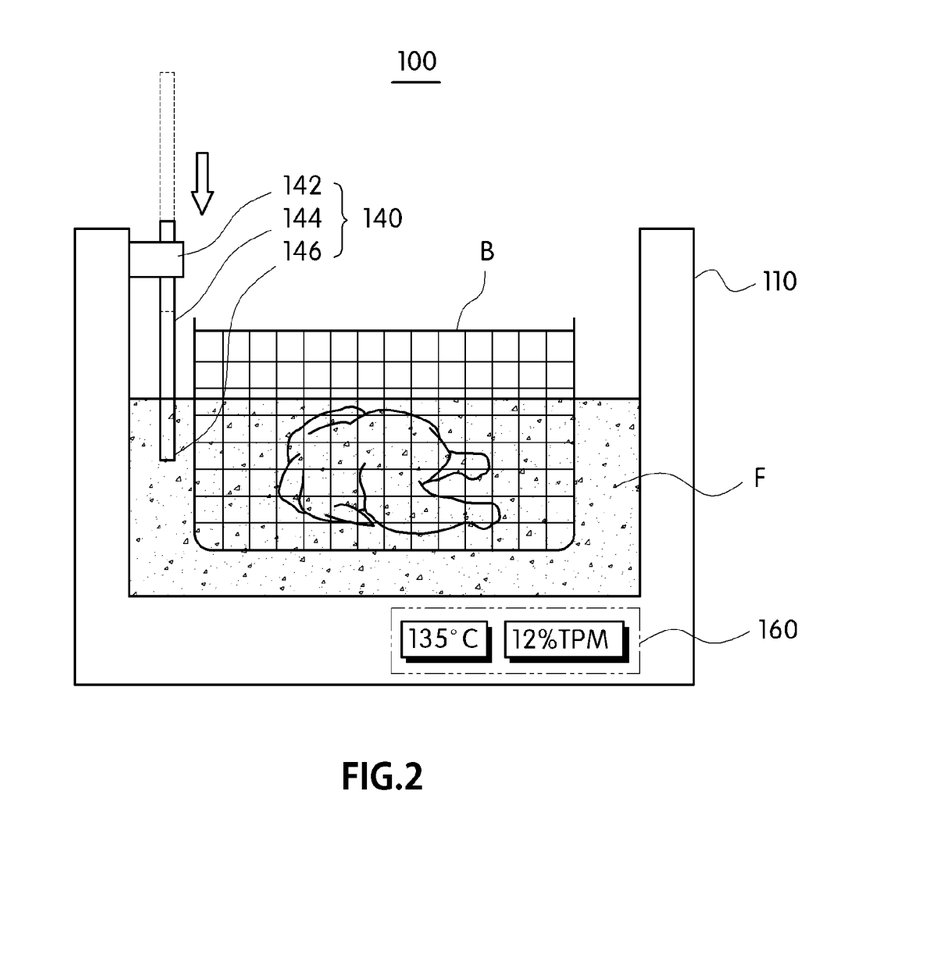
FIGS. 2 and 3 are a cross-sectional view and a block diagram, respectively, of a fryer including an acid value measuring device according to the present invention.
Figure 3:
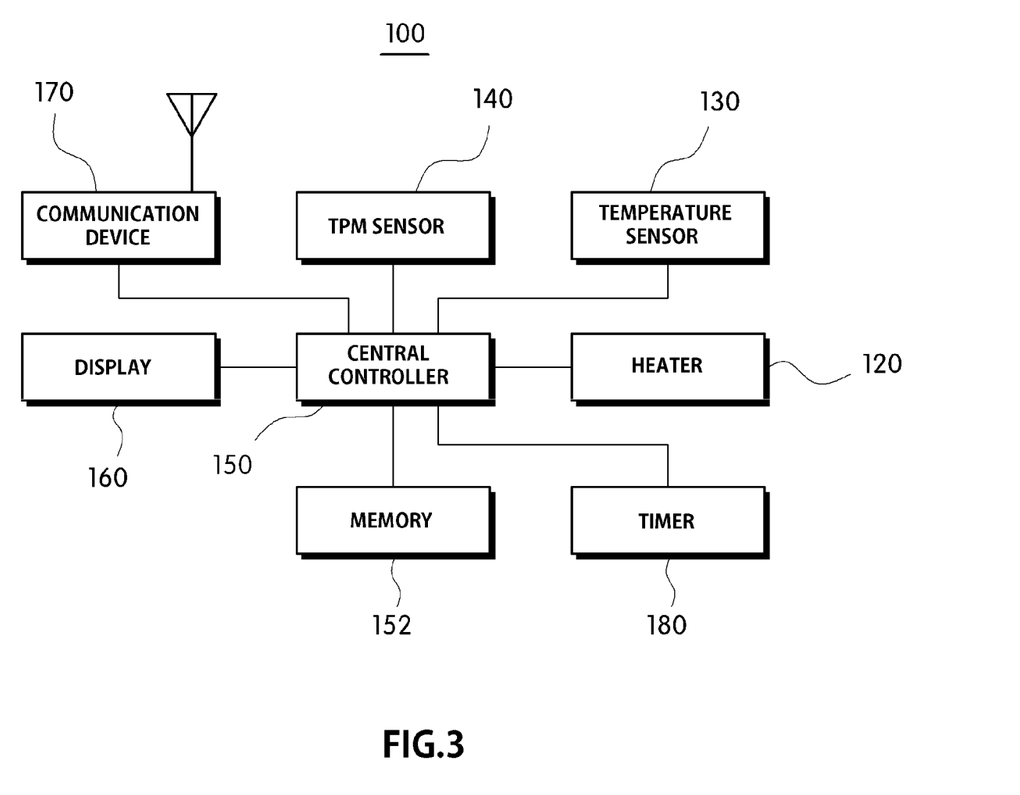

Referring to FIGS. 2 and 3, the fryer 100 may comprise a frying tank 110 for holding frying oil F, a heater 120 for heating the frying oil F, a temperature sensor 130 for sensing temperature of the frying oil F, a TPM sensor unit 140 for sensing rancidity of the frying oil F, a central controller 150 for controlling On/Off operation of the heater 120 based on temperature measurement value or TPM value provided by the temperature sensor 130 and the TPM sensor unit 140, respectively, a display 160 for indicating the temperature measurement value or the TPM value, and a communication device 170 for transmitting the TPM value to the POS terminal 200 or the shop monitor 500.

A fry basket B for holding fried chicken is further installed in the frying tank 110. The heater 120 may include an induction heating coil that is heated by magnetic induction. In addition, the frying tank 110 may further include a mesh strainer for removing dregs of the frying oil F, a filter for refining the frying oil F, a duct for discharging the frying oil F, and an oil level sensor for detecting oil level of the frying oil F.

As described in Table 1, the display 160 can indicate TPM value together with grade according to quality of frying oil. The grade may be classified and indicated by red, yellow and green color LED. Further, an alarm is used to signal replacement time of frying oil.

The central controller 150 can receive the TPM value according to pre-programmed manual, and inform a shop clerk via the display 160 or the alarm if the TPM value exceeds a reference value stored in a memory 152, or automatically turn the heater 120 off. Otherwise, the TPM value of the frying oil may be transmitted to the POS terminal 200.

As such, the shop clerk determines replacement time of the frying oil by viewing the TPM value displayed on the display 160 in real time. A customer ordering at shop can recognize TPM value by seeing frying oil information on a shop monitor. A customer ordering by phone can recognize TPM value by seeing frying oil information in a text message provided by the POS terminal 200 or the integration server 300.

The TPM sensor unit 140 may include a supporter 142 attached to an inside wall of the frying tank 110, a slider 144 supported by the supporter 142, which is capable of moving up and down, and a TPM sensor 146 installed on the bottom of the slider 144, which is selectively dipped into the frying oil F.

According to the present invention, measurement of the TPM sensor is characterized by measuring rancidity of frying oil in real time. Meanwhile, it is not preferable for the TPM sensor 146 to be continuously dipped into frying oil since high temperature of frying oil F (for example, 163° C. to 204° C.) is a cause of the failure of the TPM sensor 146. Therefore, it is needed to switch the TPM sensor 146 to standby mode in which the TPM sensor 146 is idle after the TPM value is repeatedly obtained and updated in a certain time interval in operating mode. Therefore, though the slider 144 may be installed to be manually operated, it may be also installed to be periodically operated by an actuator (not shown) mounted on the supporter during a fixed time according to a timer 180.

For example, if it is necessary to measure rancidity of frying oil, by button operation of a shop clerk, the slider 144 may be lowered into frying oil F to operate the TPM sensor unit 140 ON or by button operation of the shop clerk after measuring the rancidity of frying oil, the slider 144 may be raised up frying oil F to turn the TPM sensor unit 140 OFF. Otherwise, it is possible to control the central controller 150 to automatically operate the TPM sensor unit 140 by switching the slider 144 up or down in time interval of 30 minutes, 1 hour, 2 hours, etc., using function of timer 180. Thus, the TPM sensor unit 140 may be manually or automatically operated as occasion demands.

The communication device 170 can transmit the TPM value to the POS terminal 200 by using Wi-Fi or other local area network, etc. Otherwise, the communication device 170 can directly transmit the TPM value to the integration server 300.

Now, a detachable external frying oil TPM sensor will be described.

Figure 4:
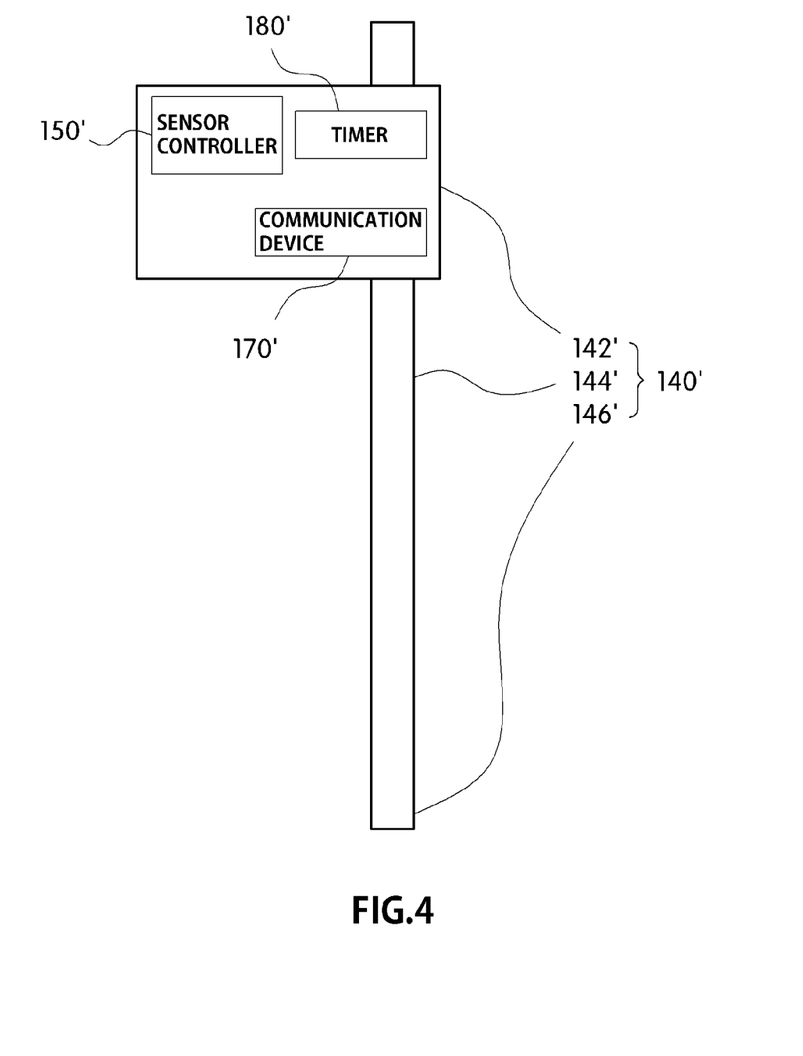
FIG. 4 is a block diagram of a detachable acid value measuring device according to the present invention.

Referring to FIG. 4, an external TPM sensor unit 140' is similar to the built-in TPM sensor unit 140 in that the external TPM sensor unit 140' includes the supporter 142' attached to an inside wall of the frying tank 110, a slider 144' supported by the supporter 142', which is capable of vertically moving up and down along the inside wall, and a TPM sensor 146' installed on the bottom of the slider 144', which measures the extent of rancidity of frying oil, and that the slider 144' may be operated manually or operated automatically by an actuator.

However, since the external TPM sensor unit 140' is additionally installed in the fryer 100, the external TPM sensor unit 140' independently includes a sensor controller 150', a communication device 170' and a timer 180' to transmit TPM value of frying oil to the display 160, the shop monitor 500 for customers ordering at shop, or the customer terminal 400 for customers ordering by phone via the POS terminal 200, to be displayed on.

A method of measuring frying oil acid value and providing acid value information in real time according to the present invention is described in detail below.

Figure 5:
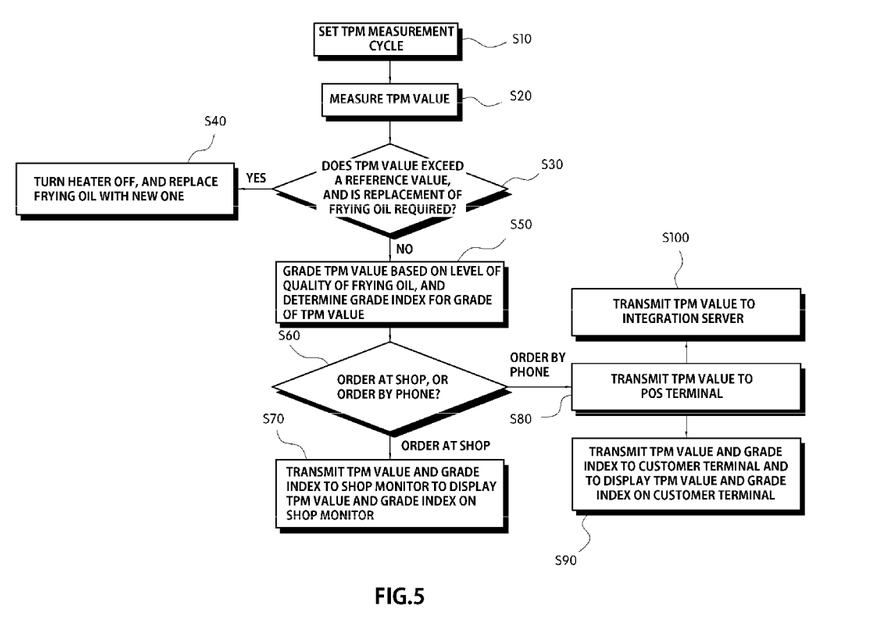
FIG. 5 is a flowchart showing a method of measuring frying oil acid value and providing acid value information in real time according to the present invention.

Referring to FIG. 5, the method of measuring frying oil acid value and providing acid value information in real time according to the present invention may comprise the steps of setting TPM measurement cycle using the timer 180 (Step S10), obtaining and updating TPM value in real time by operating the TPM sensor unit 140 according to the TPM measurement cycle (Step S20), determining replacement time of frying oil by comparing the TPM value with a reference value stored in the memory 152 (Step S30), turning off the heater 120 by the central controller 150 when the TPM value exceeds the reference value (Step S40), grading the TPM value according to quality of frying oil and determining a grade index when the TPM value does not exceed the reference value (Step S50), determining order at shop or order by phone (Step S60), transmitting the TPM value and the grade index to the shop monitor 500 to display thereon in case of order at shop (Step S70), transmitting the TPM value and the grade index to the POS terminal 200 in case of order by phone (Step S80) and displaying the transmitted TPM value and grade index on the customer terminal 400 (Step S90), and transmitting the frying oil information in shop to the integration server 300 (Step S100).

As described above, it may be known that the present invention has a technical idea that is a configuration designing a acid value measuring device to automatically cut off the power supply when a frying oil acid value exceeds a reference value and managing the reference value over a proper level by collecting and analyzing acid value information of shop received by an integration server. It is to be understood that various changes and modification will be apparent to those skilled in the art without departing from the above technical idea of the present invention.

The invention claimed is:

1. A system for measuring acid value of frying oil and providing acid value information of the frying oil in real time, the system comprising:
    a fryer installed in a branch shop, wherein the fryer is configured to cook a fried food and includes: a frying tank configured to contain frying oil, and a heater configured to heat the frying oil;
    a TPM sensor unit configured to measure a TPM value of the frying oil contained in the frying tank at a predetermined time interval;
    a POS terminal provided in the branch shop and configured to store the measured TPM value;
    a shop monitor installed in the branch shop and connected to the POS terminal;
    an integration server installed in a headquarter managing the branch shop and connected to the POS terminal via a first communication network, wherein the integration server is configured to collect the measured TPM value from the POS terminal, wherein the POS terminal is configured to transmit the measured TPM value to the integration server; and
    a customer terminal capable of being connected to the integration server and the POS terminal via a second communication network and configured to make an order of the fried food via the second communication network,
    wherein the integration server is further configured, upon receiving the order, to transmit directly to the customer terminal a most recently measured TPM value stored in the POS terminal or to make the POS terminal to transmit the most recently measured TPM value to the customer terminal, thereby enabling a customer to confirm a quality of the frying oil, by which the ordered fried food is cooked.

2. The system according to claim 1, wherein the shop monitor includes a display installed inside or outside the branch shop and configured to display the measured TPM value.

3. The system according to claim 2, wherein the measured TPM value is graded in Good, Replacement and Poor according to a level of quality and displayed with grade indexes in green, yellow, and red, respectively.

4. The system according to claim 1, wherein the TPM sensor unit includes: a TPM sensor, and
    wherein the TPM sensor unit is further configured to dip the TPM sensor into the frying oil contained in the frying tank at the predetermined time interval and measure the TPM value.

5. The system according to claim 1, wherein the integration server is further configured to turn off operation of the fryer when the measured TPM value is higher than a predetermined TPM value.

6. The system according to claim 1, wherein the integration server and the POS terminal are configured to transmit the most recently measured TPM value to the customer terminal in a form of a text message.

\* \* \* \* \*